(12) United States Patent
Smith

(10) Patent No.: US 8,313,271 B2
(45) Date of Patent: Nov. 20, 2012

(54) MANUFACTURE OF LARGE PARTS ON SMALL MACHINES

(75) Inventor: Kevin Scott Smith, Huntersville, NC (US)

(73) Assignee: University of North Carolina at Charlotte, Charlotte, NC (US)

( * ) Notice: Subject to any disclaimer, the term of this patent is extended or adjusted under 35 U.S.C. 154(b) by 1473 days.

(21) Appl. No.: 11/777,336

(22) Filed: Jul. 13, 2007

(65) Prior Publication Data

US 2009/0018689 A1 Jan. 15, 2009

(51) Int. Cl.
*B23C 1/00* (2006.01)
*B23Q 15/00* (2006.01)

(52) U.S. Cl. .............. 409/131; 409/80; 409/212; 408/3; 700/186; 700/193; 700/194; 702/85

(58) Field of Classification Search .......... 409/131–132, 409/202, 212, 79–80; 408/3; 700/193–194, 700/186, 177; 702/33, 85; 73/1.79, 1.81
See application file for complete search history.

(56) References Cited

U.S. PATENT DOCUMENTS

| 2,892,388 | A | * | 6/1959 | Daugherty | 409/202 |
|---|---|---|---|---|---|
| 2,968,517 | A | * | 1/1961 | Daugherty et al. | 108/7 |
| 5,093,978 | A | * | 3/1992 | Binder | 483/43 |
| 5,163,793 | A | * | 11/1992 | Martinez | 409/205 |
| 5,575,318 | A | * | 11/1996 | Susnjara | 409/212 |
| 5,863,359 | A | * | 1/1999 | Karabin et al. | 148/437 |
| 5,895,181 | A | * | 4/1999 | Ito et al. | 409/132 |
| 5,949,685 | A | * | 9/1999 | Greenwood et al. | 700/193 |
| 6,782,596 | B2 | | 8/2004 | Miller | |
| 7,065,851 | B2 | | 6/2006 | Miller | |
| 7,073,239 | B2 | * | 7/2006 | Miller | 29/407.05 |
| 2011/0022220 | A1 | * | 1/2011 | Smith et al. | 700/186 |

* cited by examiner

*Primary Examiner* — Erica E Cadugan
(74) *Attorney, Agent, or Firm* — Hammer & Associates, P.C.

(57) ABSTRACT

The present invention provides a method for machining a part from a workpiece. The workpiece is divided into a plurality of sectors and a plurality of fiducials are disposed within each sector. The separation distance between each fiducial is then calibrated to a workpiece distance unit. The present invention then includes the steps of a) positioning the workpiece into the desired position relative to a cutting machine; b) calibrating the cutting machine to the workpiece distance units of one sector; c) cutting one sector with the calibrated cutting machine; d) repeating steps a-c until the part is completed.

8 Claims, 3 Drawing Sheets

Fiducials Selected from the Group Including: Inherent Fiducials, Intrinsic Fiducials, Fabricated Fiducials, Permanent Fiducials, Removable Fiducials, or Combinations Thereof

Figure 3

Cutting Machine Selected from the Group Including: a Portal-Type Mill, a Gantry-Type Mill, a Horizontal Spindle Mill, a Vertical Spindle Mill, a Universal Mill, a Box Mill, a C-Frame Mill, a Knee Mill, a Bed Mill, a Floor Mill, or Combinations Thereof

Figure 4

MANUFACTURE OF LARGE PARTS ON SMALL MACHINES

FIELD OF THE INVENTION

The present invention relates to the manufacture of large parts on small machines through the use of fiducial calibration methods.

BACKGROUND OF THE INVENTION

A milling machine is a power-driven machine used for the shaping of parts. In its simplest form, a milling machine consists of a rotating cutter and a workspace. A workpiece is placed on and/or secured to the workspace and the rotating cutter is guided to remove unwanted material from the workpiece to shape the desired part. To accomplish this, either the rotating cutter is moved while the table is stationary, the table is moved while the rotating cutter is stationary, or both the rotating cutter and the table move to allow the rotating cutter to remove material.

Early milling machines were operated manually which allowed production of parts with limited complexity. Computers then spurred the development of computer numerical control (CNC) machines. CNC milling machines allow for the production of extremely complex parts. The more advanced CNC milling-machines add one or more additional axes in addition to the three standard axes (XYZ). The C axis allows the workpiece to be rotated. The B-axis controls the tilt of the tool itself. When all of these axes are used in conjunction with each other, extremely complicated geometries, even organic geometries, such as a human head, can be made with relative ease with these machines.

Milling machines are used to manufacture parts like aircraft and ship components. Large milling machines may be massive enough to require their own building. These massive milling machines are very expensive as are the parts produced by them. Due to the high costs involved, little competition exists for the owners of these mammoth machines.

One drawback for large milling machines is that the further the cutting tool gets away from the center of the workpiece, the less accurate the cutting becomes. This decrease in accuracy may be described and visualized as a "bow-tie" template. A variety of factors contribute to the inaccuracies realized as a cutting tool moves further from the center of the workpiece. These factors include environmental variations (e.g., thermal variations), and structural variations in both the workpiece and the milling machine. These variations result in expansion and/or contraction of the workpiece and the milling machine.

A fiducial calibration system is disclosed in U.S. Pat. Nos. 6,782,596 and 7,065,851 which are herein incorporated by reference. The use of fiducials has improved accuracy in the production of parts. However, this has accomplished nothing in reducing the size of gargantuan milling machines required to mill them. In the industry today, a milling machine must be as large as the largest dimension of the part it is manufacturing. For example, if a part's dimensions are 10×3×1 meters, it will require a milling machine that can traverse the entire 10 meters. It would be a great benefit to the industry if a milling machine was required to accommodate only the second largest dimension of a three dimensional workpiece or part. Using the example from above, a milling machine would only be required to accommodate the 3 meter dimension instead of the 10 meter dimension. However, size is not the only relevant factor. A milling machine which may accommodate a part whose dimensions are 1.0×0.1×0.05 meters would be required to accommodate the 0.1 meter dimension instead of the 1.0 meter dimension. That translates to a machine that may sit on a tabletop instead of a larger machine that must sit on the floor.

The benefits would include cost savings for the manufacturer from constructing smaller milling machines, cost savings to the consumer from constructing smaller milling machines and increased competition between part manufacturers.

Hence, there exists an unsatisfied need for a more accurate and less expensive method for the manufacture of large parts on small machines through the use of fiducial calibration methods.

SUMMARY OF THE INVENTION

The present invention provides a method for machining a part from a workpiece. The workpiece is divided into a plurality of sectors and a plurality of fiducials are disposed within each sector. The separation distance between each fiducial is then calibrated to a workpiece distance unit. The present invention then includes the steps of a) positioning the workpiece into the desired position relative to a cutting machine; b) calibrating the cutting machine to the workpiece distance units of one sector; c) cutting one sector with the calibrated cutting machine; d) repeating steps a-c until the part is completed.

BRIEF DESCRIPTION OF THE DRAWINGS

FIG. 3 schematically shows different types of fiducials according to various embodiments of the present invention.

FIG. 4 schematically shows different types of cutting machines according to various embodiments of the present invention.

DETAILED DESCRIPTION

Figure 1:
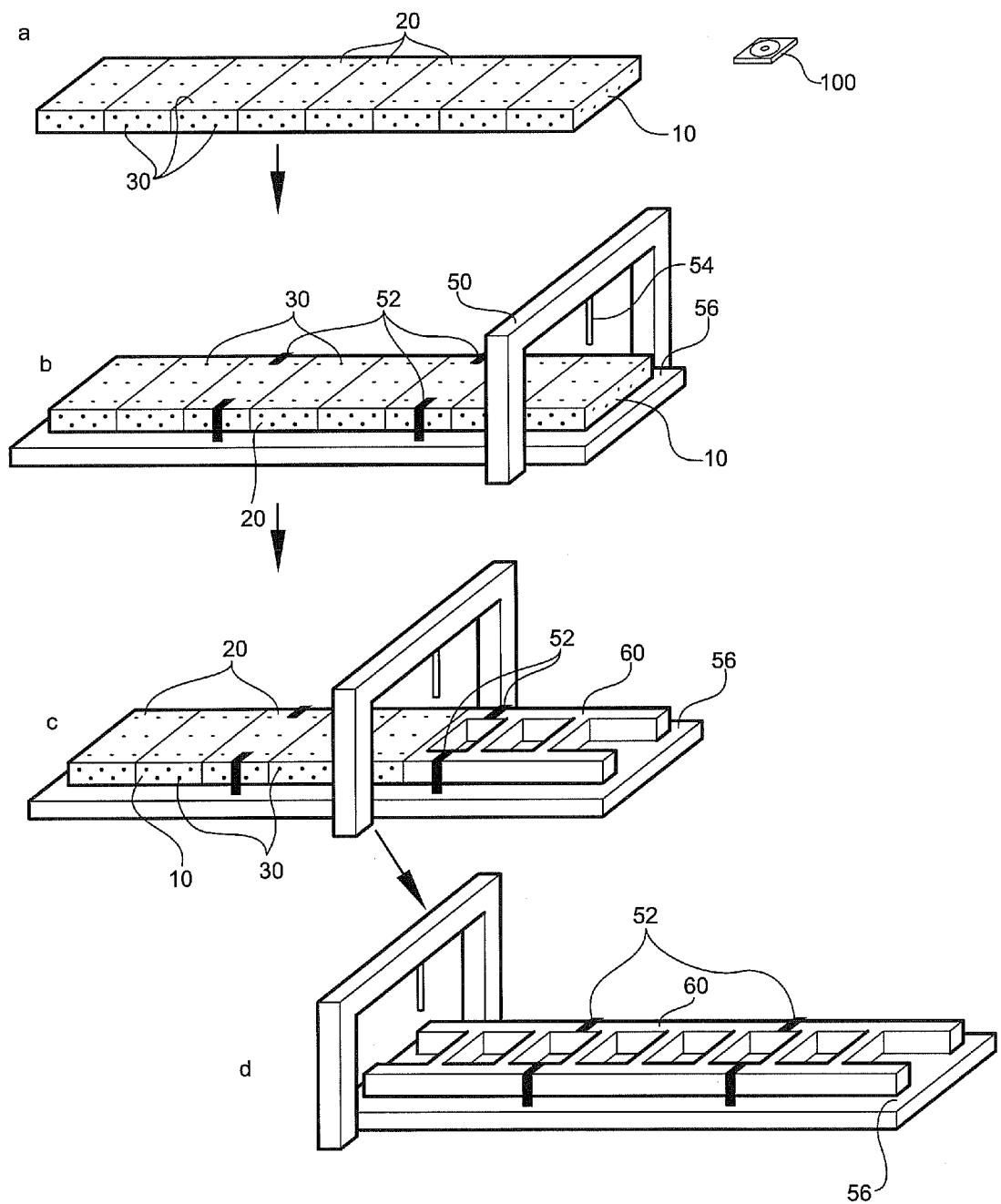
FIG. 1 is a flow chart illustrating an embodiment of a stock piece/workpiece going from a manufacturer to a completed part.

Referring to the drawings, wherein like numerals indicate like elements, a flow diagram is shown in FIG. 1 of an embodiment of a stock piece/workpiece 10 as it goes from a manufacturer or dealer to a completed part 60. To create a stock piece, a manufacturer may begin with a slab, billet, bloom, plate, bar, rod, or some other form of stock piece/workpiece 10. The manufacturer may then form that stock piece/workpiece 10 to a desired size, shape, or combination thereof. The manufacturer may then place the stock piece/workpiece 10 into an environmentally controlled room or building and allow the stock piece/workpiece to become acclimated to that environment (i.e., temperature, pressure, humidity). The stock piece may then be divided into a plurality of sectors 20. The manufacturer may then secure a plurality of fiducials 30 at predetermined or random points within each sector 20. FIG. 1a illustrates one embodiment of the stock piece/workpiece 10 as it may be offered by a manufacturer. The manufacturer records the fiducial locations and measurements between the fiducials and transfers those figures to a means for conveying fiducial information 100. FIG. 1a illustrates a means for conveying fiducial information 100 which in this embodiment is a DVD.

FIG. 1b illustrates one embodiment where a machinist has placed the stock piece/workpiece 10 into a cutting machine 50 and secured the stock piece/workpiece 10 to a table 56 using a clamping device 52. The machinist may then transfer the information from the means for conveying fiducial information 100 to the cutting machine 50 and calibrate the cutting machine in order to accurately produce a completed part 60 (See U.S. Pat. Nos. 6,782,596 and 7,065,851). The cutting machine 50 will use its cutting tool 54 to begin removing material from the stock piece/workpiece 10 based on the fiducial information obtained from the means for conveying fiducial information 100. The cutting machine 50 may remove material from only one sector 20 at a time. When all desired material is removed from a sector 20, the stock piece is unclamped from the table 56, advanced beneath the cutting machine 50, and re-secured to the table 56 using the clamping device 52 to allow cutting of a new sector 20. The cutting machine 50 and the stock piece/workpiece 10 may be re-calibrated numerous times before, during, and after cutting begins. FIG. 1c illustrates one embodiment where the cutting machine 50 has removed material from several sectors 20, thereby revealing some of the completed part 60, and is continuing to advance one sector 20 at a time down the stock piece 10. FIG. 1d illustrates one embodiment where the cutting machine 50 has removed all of the desired material from the stock piece/workpiece 10 resulting in the completed part 60.

A part 60, as used herein, means any part which is machined from a stock piece/workpiece by any method described herein. Parts may range in size from microscopic to monolithic. The part may be machined from any material including, but not limited to, metal, plastic, wood, or combinations thereof. Suitable metals include, but are not limited to, steel, carbon steel, aluminum, bronze, iron, copper, nickel, tin, titanium, manganese, magnesium, beryllium, and combinations thereof. Suitable plastics include, but are not limited to, polyethylene, polypropylene, polybutylene, polyethylene terephthalate, polycarbonate, poly vinyl chloride, and combinations thereof. If polyethylene or polypropylene is used, it is preferably a high density or an ultra high density polymer. In one embodiment, the part may be a whole part machined from a single piece of material. In another embodiment, the part may be one piece of a plurality of pieces which may be assembled into a part. In yet another embodiment, the part may be machined which is a nano-scale part. In yet another embodiment, the part may be machined which is a mega-scaled part.

The machining of parts, as used herein, generally refers to the process of removing material from a workpiece in order to create a part. Traditionally, machining involved the use of power driven machine tools, such as lathes, milling machines, or drills, to machine metal. In the present invention, the machining of parts includes material made from metal, wood, plastics, or combinations thereof. The machining may be accomplished by cutting excess material in the form of chips from the part, by shearing the material, by squeezing metallic parts to the desired shape, by applying electricity, by focusing ultrasound waves, by focusing electrons, or corrosive chemicals to the material, or combinations thereof.

Figure 2:
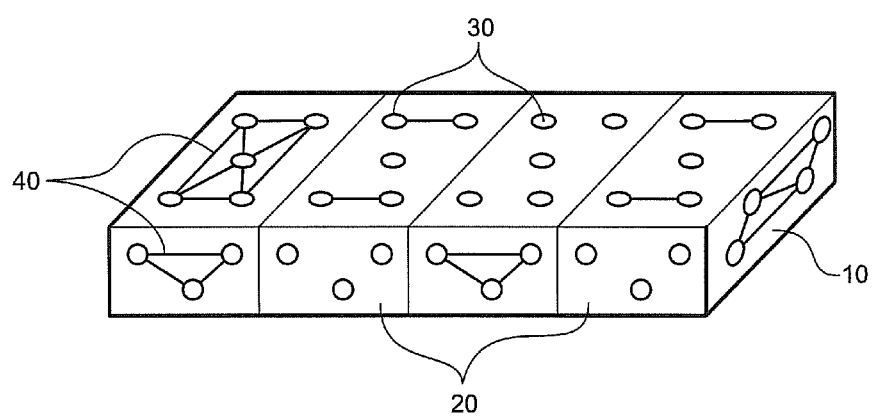
FIG. 2 illustrates an embodiment of a stock piece/workpiece detailing a plurality of sectors containing a plurality of fiducials.

A workpiece 10, as used herein, means any workpiece from which one or more parts or pieces of parts are derived from. FIGS. 1 and 2 each illustrate a different embodiment of a workpiece 10. The workpiece 10 may be divided into a plurality of sectors 20. The sectors 20 may then be marked individually or in combination with a plurality of fiducials 30. The separation distance 40 between each fiducial 30 or combination of fiducials may then be measured. The separation distance 40 may then be converted into workpiece distance units.

The workpiece 10 generally has three dimensions. The dimensions may all be equal to one another or the dimensions may vary. In one embodiment, a first dimension is equal to or longer than either the second dimension and the third dimension (e.g., 3 meters by 1 meter by 0.5 meters).

The workpiece 10 may be selected from any material including, but not limited to, metal, plastic, wood, or combinations thereof. Suitable metals include, but are not limited to, steel, carbon steel, aluminum, bronze, iron, copper, nickel, tin, titanium, manganese, magnesium, beryllium, and combinations thereof. Suitable plastics include, but are not limited to, polyethylene, polypropylene, polybutylene, polyethylene terephthalate, polycarbonate, poly vinyl chloride, and combinations thereof. If polyethylene or polypropylene is used, it is preferably a high density or an ultra high density polymer. The workpiece 10 may have a shape including, but not limited to, a cube, a cuboid, a cylinder, a prism, a tetrahedron, a pyramid, a sphere, or combinations thereof.

Sector 20, as used herein, refers to a known area on the surface or within the workpiece. FIGS. 1 and 2 each illustrate a different embodiment of a sector 20. The workpiece 10 may be divided in to one or more sectors 20. FIG. 2 illustrates one embodiment wherein the workpiece 10 is divided into a plurality of sectors 20. In another embodiment, the workpiece 10 may be comprised of a single sector 20. The sectors 20 may include, but are not limited to, a rectangle, a square, a circle, a semicircle, a triangle, a oblong, a oval, a tetrahedral, a trapezoid, a diamond, a cube, a cuboid, a cylinder, a prism, a tetrahedron, a pyramid, a sphere, or combinations thereof.

Fiducial 30, as used herein, refers to a mark in a known position within a sector 20 of a workpiece 10. FIGS. 1 and 2 each illustrate a different embodiment of a fiducial 30. A fiducial 30 may be selected from the group comprising inherent fiducials, intrinsic fiducials, fabricated fiducials, permanent fiducials, removable fiducials, or combinations thereof. In one embodiment, a fiducial 30 may be a geometric shape adhered to the surface of a workpiece 10. In another embodiment, a fiducial 30 may be a laser mark etched into the surface of a workpiece 10. In yet another embodiment, a fiducial 30 may be a radioactive compound placed on the surface of or within a workpiece 10.

Separation distance 40, as used herein, refers to the measured distance between adjacent fiducials 30 at a known temperature. FIG. 2 illustrates one embodiment of the separation distance 40. The separation distance 40 between fiducials 30 will increase as the temperature of the workpiece 10 increases. The separation distance 40 between fiducials 30 will decrease as the temperature of the workpiece 10 decreases. After the separation distances 40 are measured between fiducials 30 at a known temperature, those separation distances 40 may be converted into workpiece distance units.

Workpiece distance unit, as used herein, refers to a standard of measurement to quantify the separation distance between the fiducials 30 on a workpiece 10. The workpiece distance units may be related to standard spatial dimensions at a given temperature (e.g., 500 workpiece distance units may be equal to 5 centimeters). The workpiece distance units thermally expand and contract with the workpiece 10. In one embodiment of the present invention, the separation distance 40 between two fiducials 30 may be 1000 workpiece distance units which may be equal to 10 centimeters. As the temperature of the workpiece 10 increases, the separation distance 40 may increase to 10.3 centimeters, but remain 1000 workpiece distance units apart. In the same embodiment, as the temperature decreases, the separation distance 40 may decrease to 9.8 centimeters, but remain 1000 workpiece distance units apart.

Positioning, as used herein, refers to the act of placing the workpiece 10 into a desired position relative to a cutting machine 50. In one embodiment, the workpiece 10 may be positioned beneath the cutting machine 50. In another embodiment, the workpiece 10 may be positioned beside the cutting machine 50. In yet another embodiment, the cutting machine 50 may be positioned beneath the workpiece 10.

Desired position, as used herein, refers to any position which allows the cutting machine 50 to remove material from a workpiece 10 in a predictable, desired manner. In one embodiment, the desired position may permit the cutting machine 50 to remove material from the entire workpiece 10 at once. In another embodiment, the desired position may permit the cutting machine 52 to remove material from part of one sector 20 of the workpiece 10. In yet another embodiment, the desired position may permit the cutting machine 50 to remove material from one sector 20 of the workpiece 10. In still another embodiment, the desired position may permit the cutting machine 50 to remove material from two or more sectors 20 of the workpiece 10. In still another embodiment, a workpiece 10 may be held in the desired position with only the weight of the workpiece 10. In still another embodiment, a workpiece 10 may be held in the desired position with or without the aid of a clamping device 52.

Cutting machine 50, as used herein, refers to any machine which is capable of removing material from a workpiece 10 in order to manufacture a part 60 or a piece of a part. FIG. 1 illustrates one embodiment of a cutting machine 50. Cutting machines 50 may range in size from very small (e.g., sits on a desktop) to monolithic (e.g., requires housing in a large building). A cutting machine 50 may include, but is not limited to, a portal-type machine, a gantry type machine, a horizontal spindle machine, a vertical spindle machine, a box mill, a C-frame mill, a knee mill, a bed mill, a floor mill, or combinations thereof. In one embodiment, the cutting machine 50 is large enough to permit the smaller second and third dimensions of a workpiece 10 to pass beneath or through and be cut by the cutting machine 50. In another embodiment, the cutting machine 50 rotates a circular tool with numerous cutting edges arranged symmetrically about its axis. In another embodiment, the cutting machine 50 is a CNC machine, a manually controlled machine, or combinations thereof. In another embodiment, the cutting machine 50 may remove materials from only one sector 20 of the workpiece 10 at a time. In yet another embodiment, the cutting machine 50 may remove material from two or more sectors 20 of a workpiece 10 at a time.

Clamping device 52, as used herein, refers to any device which is capable of clamping a workpiece 10 and holding the workpiece 10 in a desired position. The clamping device 52 then releases the workpiece 10. FIG. 1 illustrates one embodiment of a clamping device 52. Examples of clamping devices 52 include, but are not limited to, spring clamps, screw clamps, band clamps, bar clamps, bench clamps, Cardellini clamp, C-clamp, magnetic clamps, miter clamps, pipe clamps, set screw clamps, speed clamps, toggle clamps, hand-screw clamps, or combinations thereof. In one embodiment, the clamping device 52 may clamp a workpiece 10 to another surface, such as a table 56 or platform. In another embodiment, the clamping device 52 may clamp a workpiece 10 to the sides of the cutting machine 50.

Calibrate, as used herein, refers to the process of standardizing by determining the deviation from a standard so as to ascertain the proper correction factors. Calibration may include the process of adjusting the output or indication on a measurement instrument to agree with value of the applied standard, within a specified accuracy. In one embodiment of the present invention, a cutting machine 50 may be calibrated to the workpiece distance units via the fiducials 30. In another embodiment, a cutting machine 50 may be calibrated to correct for variations including, but not limited to, thermal variations, environmental variations, structural variations, placement variations, orientation variations, machine construction variations, and combinations thereof. In another embodiment, the cutting machine 50 may be calibrated before the workpiece 10 is machined. In another embodiment, the cutting machine 50 may be calibrated one or more times while the workpiece 10 is being machined. In yet another embodiment, the cutting machine 50 may be calibrated after the workpiece 10 or part 60 is machined.

Cutting, as used herein, refers to the physical act of a substance or tool removing material from a workpiece 10 in order to manufacture a part 60. Cutting may result in flat surfaces, grooves, shoulders, inclined surfaces, dovetails, T-slots, concave forms, convex grooves, rounded corners, or combinations thereof. Cutting may be achieved by methods including, but not limited to, electron-beam machining, electrical discharge machining, electrochemical machining, ion-beam machining, laser machining, plasma arc machining, ultrasonic machining, chemical machining, photochemical machining, water-jet machining, or combinations thereof. In one embodiment, cutting may occur as the workpiece 10 is fed against a rotating cutting tool 54. In another embodiment, cutting may occur as the rotating cutting tool 54 is pressed into the workpiece 10. In yet another embodiment, cutting may occur as a beam of high-velocity electrons is focused on the workpiece 10.

Cutting tools 54, as used herein, refers to tools which may be used to remove material from a workpiece 10 in order to manufacture a part 60. FIG. 1 illustrates one embodiment of a cutting tool 54. Cutting tools 54 of many shapes and sizes are available for a wide variety of milling operations. Cutting tools 54 may include, but are not limited to, slot drills, end mills, ball nose cutters, shell mills, side and face cutters, hobbing cutters, face mills, involute gear cutters, woodruff cutters, or combinations thereof. In one embodiment, a cutting tool 54 may be a single point cutting tool. In another embodiment, a cutting tool 54 may be a multiple point cutting tool. Additional cutting tools 54 include, but are not limited to, electron beams, electrical discharges, electrochemicals, ion beams, lasers, plasma arcs, ultrasonic waves, chemicals, photochemicals, water jets.

In order to remove material from a workpiece 10, a cutting tool 54 must be harder than the workpiece 10 and must maintain a cutting edge at the temperature produced by the friction of the cutting action. Cutting tools 54 may be made from materials including, but not limited to, carbon steel, high-speed steel, cobalt alloys, chromium alloys, tungsten alloys, tungsten carbide, ceramic oxides, diamonds, or combinations thereof. In one embodiment, the cutting tool 54 may be carbide tipped. In another embodiment, the cutting tool 54 may be made from bonded aluminum oxide. In yet another embodiment, the cutting tool 54 may be diamond tipped.

Thermal variations, as used herein, refers to variations in temperature. Thermal variations may be caused by a variety of factors including, but not limited to, internal heat, external heat, friction, or combinations thereof. Environmental variations, as used herein, refers to variations in temperature, humidity, and atmospheric pressure. Structural variations, as used herein refers to variations resulting from the expansion and contraction of materials which may be in response to environmental variations. Placement variations, as used herein, refers to variations in the positioning of the workpiece 10 relative to the cutting machine 50. In one embodiment, a placement variation may result from a workpiece 10 not being positioned within a cutting machine 50 squarely in reference to the machine's X and Y axes. Orientation variations, as used herein, refers to variations in the orientation of the workpiece 10 to the cutting machine 50 and vice versa. In one embodiment, an orientation variation may result from a cutting machine 50 being positioned on a workpiece 10 at an angle. Machine construction variations, as used herein, refers to variations in how a machine is constructed in comparison to its specifications. In one embodiment, the machine construction variation may result in the various axes of a cutting machine 50 not being square to one another. In another embodiment, the machine construction variation may result in the X and Y axes not being perpendicular to one another. In another embodiment, the machine construction variation may result in the Y and Z axes not being perpendicular to one another.

Both the workpiece 10 or part 60 and the cutting machine 50 are subject to thermal variations, environmental variations, structural variations, placement variations, orientation variations, and combinations thereof. These variations may alter the real position of the cutting tool 54 or probe with respect to the workpiece 10 during the manufacturing, inspection, or assembly process, resulting in real part errors, measurement errors during inspection, or assembly alignment errors. In one embodiment, the variations outlined above may be corrected through calibration. In another embodiment, the variations outlined above may be corrected through mathematical computation (e.g., scientific computation, numerical methods, stochastic methods).

Apparatus for machining a part, as used herein, refers to an apparatus wherein a workpiece may be placed, machined, and removed resulting in a completed part. In one embodiment, the apparatus for machining a part may include a cutting machine and cutting tools for cutting a workpiece. In another embodiment, the apparatus for machining a part may include a cutting machine, a clamping device, and cutting tools for cutting a workpiece. In still another embodiment, the apparatus for machining a part may include a cutting machine and cutting tools for cutting a workpiece. The apparatus may be subject to thermal variations, environmental variations, structural variations, placement variations, orientation variations, machine construction variations, and combinations thereof. The apparatus may be calibrated to a standard defined by a workpiece distance unit. The apparatus for machining a part may be comprised of any of the cutting machines described above.

Stock piece, as used herein, refers to a piece of material from which a part 60 may be made. A stock piece may include the workpiece described above wherein said workpiece 10 is divided into a plurality of sectors 20 and a plurality of fiducials 30 are contained within each sector 20. The separation distance 40 between two or more fiducials 30 is measured at a known temperature, humidity level, and atmospheric pressure and those distances are converted into workpiece distance units. All fiducial information is then recorded on or within some tangible medium 100. The tangible medium may be the means of conveying fiducial information from one entity to another.

Means of conveying fiducial information 100, as used herein, refers to any means by which fiducial information may be conveyed from one entity to another. Means of conveying fiducial information 100 may be selected from the group comprising: a barcode, a disk, a CD, a DVD, a zip drive, a flash drive, an internet site, an intranet site, an email, a software program, or combinations thereof.

The present invention may be embodied in other forms without departing from the spirit and the essential attributes thereof, and, accordingly, reference should be made to the appended claims, rather than to the forgoing specification, as indicated in the scope of the invention.

I claim:

1. A method for machining a part from a workpiece comprising the steps of:
    a. providing said workpiece;
        said workpiece being divided into a plurality of sectors; each said sector having a plurality of fiducials;
            said fiducials having a separation distance between each said fiducial being calibrated to a workpiece distance unit;
    b. positioning said workpiece into a desired position relative to a cutting machine;
    c. clamping said workpiece into said desired position;
        said cutting machine having a clamping device for clamping said workpiece into said desired position;
    d. calibrating said cutting machine to said workpiece distance units of one sector;
    e. cutting said one sector utilizing said calibrated cutting machine;
    f. unclamping said workpiece;
    g. removing said workpiece from said desired position;
    h. positioning said workpiece into another desired position relative to said cutting machine;
    i. clamping said workpiece into said another desired position;
    j. calibrating said cutting machine to said workpiece distance units of another sector;
    k. cutting said another sector utilizing said calibrated cutting machine; and
    repeating steps f-k as needed to complete the machining of said part.

2. The method of claim 1 wherein said workpiece has three dimensions, a first dimension, a second dimension and a third dimension; said first dimension being equal to or longer than said second dimension and said third dimension.

3. The method of claim 2 wherein said cutting machine has dimensions large enough to allow said second dimension and said third dimension to pass beneath or through said cutting machine.

4. The workpiece of claim 1 wherein said plurality of fiducials are selected from the group comprising inherent fiducials, intrinsic fiducials, fabricated fiducials, permanent fiducials, removable fiducials, or combinations thereof.

5. The method of claim 1 wherein said cutting machine is selected from the group comprising: a portal-type mill, a gantry type mill, a horizontal spindle mill, a vertical spindle mill, a universal mill, a box mill, a C-frame mill, a knee mill, a bed mill, a floor mill, or combinations thereof.

6. The method of claim 1 wherein said workpiece is made of a material selected from the group comprising: steel, carbon steel, aluminum, bronze, iron, copper, nickel, tin, titanium, manganese, magnesium, beryllium, or combinations thereof.

7. The method of claim 1 wherein said workpiece and said cutting machine are subject to thermal variations, environmental variations, structural variations, placement variations, orientation variations, machine construction variations, or combinations thereof.

8. The method of claim 1 further comprising periodically recalibrating said cutting machine to said workpiece distance units.

* * * * *